Nov. 30, 1954 W. H. NORDENSON 2,695,503
POWER TAKE-OFF
Original Filed Nov. 14, 1946 2 Sheets-Sheet 1

INVENTOR
W. H. Nordenson
BY
ATTORNEYS

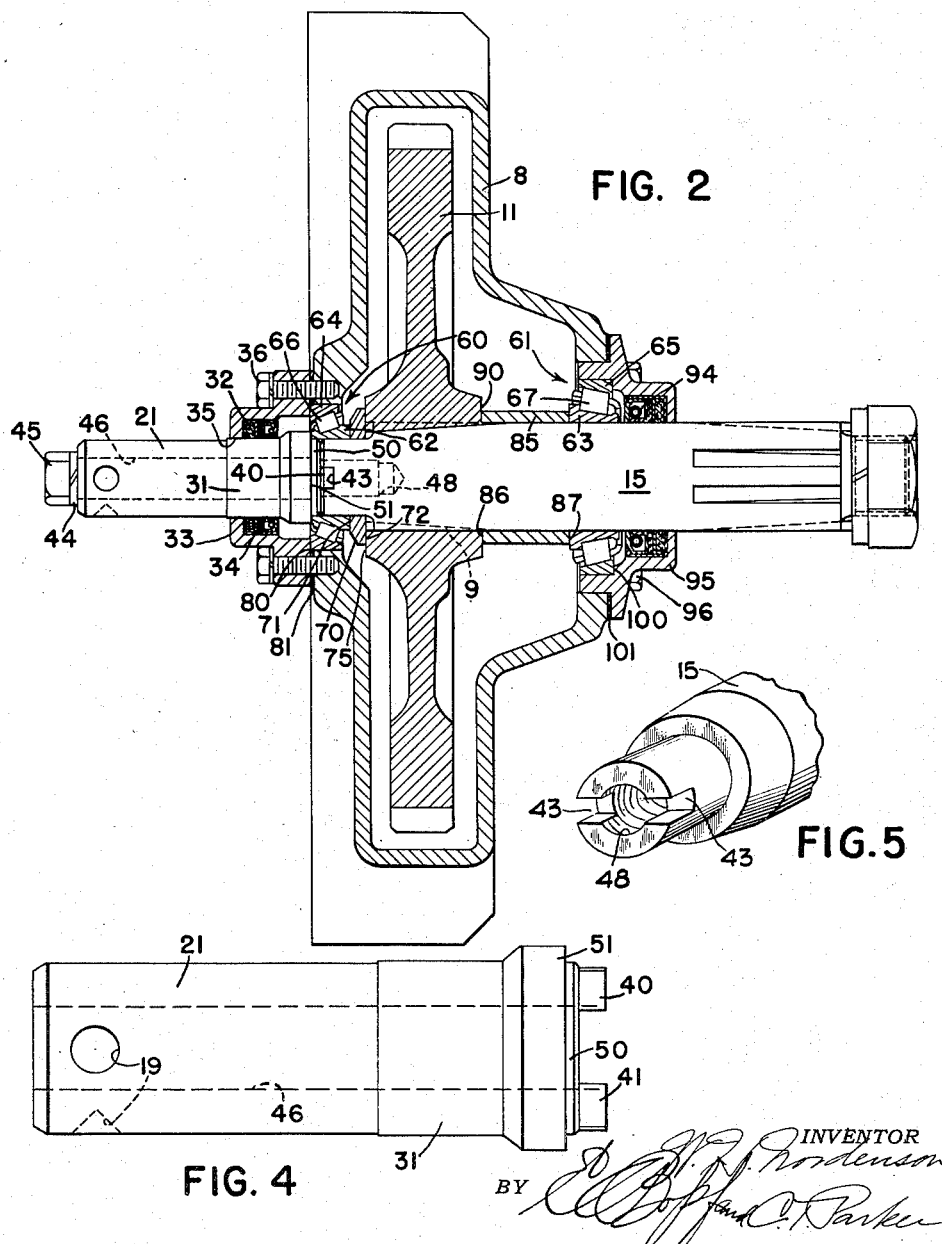

United States Patent Office 2,695,503
Patented Nov. 30, 1954

2,695,503

POWER TAKE-OFF

Willard H. Nordenson, Dubuque, Iowa, assignor to Deere Manufacturing Co., a corporation of Iowa Continuation of application Serial No. 709,691, November 14, 1946. This application January 18, 1952, Serial No. 267,110

2 Claims. (Cl. 64—1)

The present invention relates generally to power take-off mechanism and more particularly to mechanism of the type applicable to tractors for driving implements associated therewith. The application is a continuation of my co-pending application, Serial No. 709,691, filed November 14, 1946, now abandoned.

Certain implements, such as tractor-drawn planters, are required to be driven at a comparatively low speed proportional to the speed of movement of the tractor and implement over the ground. Although many tractors have engine-driven power take-off shafts, the speed of rotation of these shafts is comparatively high and must be geared down for driving planting mechanism. Furthermore, the usual power take-off is connected to the tractor transmission ahead of the change speed gears, whereby the speed of the power take-off shaft is substantially constant, regardless of which gear connection is being used to propel the tractor. The principal object of the present invention, therefore, relates to the provision of an improved power take-off connection for supplying power at a speed substantially proportional to the ground speed at all times.

Row crop tractors of the type provided with traction wheels which are laterally adjustable on splined axles are frequently provided with sprockets which mount on the axles adjacent the wheels. However, in the case of single row tractors of the type having final drive housings which depend from opposite ends of the axle housings, there are no exposed shafts on which to mount a sprocket or the like. Therefore, it is a further object of the present invention to provide a novel and improved power take-off connection to the wheel of a tractor of the type last mentioned above.

More specifically, a further object relates to the provision of an extension for one of the stub wheel axles of a tractor having depending final drive housings, the extension being detachably mounted on the inward side of one of the final drive housings and having means interfitting with the end of the axle to cause the extension to rotate with the axle. A sprocket, pulley, or the like, can then be fastened on the extension to drive the implement.

A still further object has to do with an extension member which can be substituted for, and will perform the additional function of, the bearing securing washer which retains the inner bearing race on the axle.

These and other objects and advantages of my invention will be apparent to those skilled in the art after a consideration of the following description taken in conjunction with the drawings appended hereto in which:

Figure 2 is a sectional plan view of one of the depending final drive housings taken generally along a line 2—2 in Figure 1, showing the implement drive in place and drawn to enlarged scale.

Figure 4 is an enlarged elevational view of the extension shaft.

Figure 5 is a fragmentary perspective view of the inner end of the axle.

Figure 1:
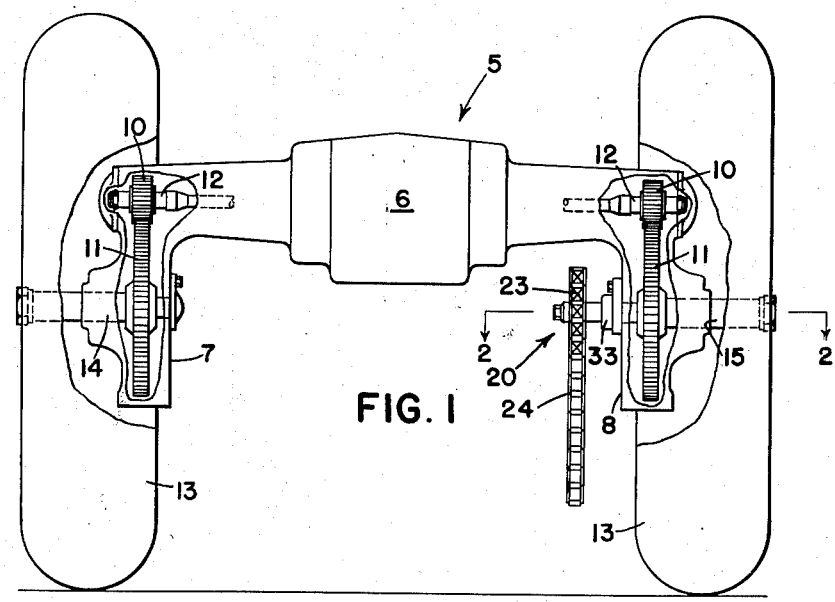
Figure 1 is a rear elevational view of the rear axle housing and rear wheels of a tractor which carries an implement drive embodying the present invention.

The rear axle housing 5 of the tractor comprises a transmission casing 6 to the sides of which are attached a pair of depending final drive housings 7 and 8. The housings contain pinions 10 and gears 11, the pinions 10 being splined on driving axles 12 and the gears 11 being secured by tapered splines 9 on wheel axles 14 and 15 for driving rear traction wheels 13. The driving axles 12 are driven through a conventional transmission from the tractor engine and drive the wheels 13 by means of the pinions 10 and gears 11.

The implement drive mechanism 20 comprises a removable extension shaft 21 for the wheel axle 15 and extends inwardly from the depending housing 8 to carry a sprocket 23 which drives a chain 24 to operate an implement (not shown).

The extension shaft 21 is in the form of a stub shaft having drilled recesses 19 adapted to receive a sprocket-securing set screw and has adjacent to its inner end a cylindrical machined surface 31 adapted to receive a conventional lubricant seal 32.

The seal 32 is conventionally retained by a cap 33. The retainer is fastened to the depending housing 8 by means of bolts 36.

The extension 21 is provided with a pair of radial lugs 40, 41 projecting axially outwardly from one end thereof and adapted to seat within a diametrical groove 43 in the end of the wheel axle 15, to cause the extension 21 to rotate with the axle 15. The extension 21 is drilled axially at 46 and is fastened to the wheel axle 15 by means of a cap screw 45 and lock washer 44, the cap screw 45 being threaded into a tapped bore 48 in the end of the axle 15.

The wheel axle 15 rotates in a pair of conventional anti-friction roller bearings 60, 61 having inner races 62, 63, outer races 64, 65, and roller sets 66, 67, respectively. The inner race 62 of the bearing 60 abuts a collar 70 having radial surfaces 71, 72 on opposite ends thereof, the collar 70 being disposed between the bearing 60 and the hub of the gear 11 with the surface 71 bearing against the inner race 62 of the bearing 60 and the surface 72 abutting a radial surface 75 on one side of the hub of the gear 11.

The extension shaft 21 is formed with a radial shoulder 51 and a pilot portion 50 having a cylindrical surface, the shoulder 51 lying between the machined surface 31 and the lugs 40, 41 and having a radial surface 51a facing the lugs. When the extension 21 is in place, the shoulder 51 bears on the inner race 62 of the bearing 60, thus exerting pressure through the inner race 62 and collar 70 to force the gear 11 tightly on the tapered splines and to hold the inner race 62 of the bearing 60, the collar 70, and the gear 11 in place on the axle 15. The cylindrical pilot portion 50 obtains some bearing support from the race 62.

An inward thrust is also imparted to the inner race 62 of the bearing 60, through the roller set 66 and the outer race 64, from the retainer 33 which when fastened in place by the bolts 36 bears against an edge 80 of the outer race 64 to hold the latter in place. The outer race 64 is drawn against the inner race 62 by the bolts 36, the pressure being determined by means of conventional shims 81.

A spacing ring 85 having radial surfaces 86, 87 on opposite ends thereof encircles the axle 15 between the gear 11 and the bearing 61, the surface 86 of the ring 85 abutting against a radial surface 90 of the hub of the gear 11, the surface 90 being disposed on the opposite side of the gear hub from the surface 75. The surface 87 of the ring 85 abuts the inner race 63 of the bearing 61.

Inward pressure is imparted to the inner race 63 of the bearing 61, through the outer race 65 and roller set 67, from a lubricant seal retainer or bearing cap 95 containing a lubricant seal 94 which is fastened in place by the bolts 96. Adjustment is made by means of shims 101. Thus, by tightening the retainers 33, 95 against the opposite sides of the housing 8, the bearings 60, 61 can be pre-loaded.

Figure 3:
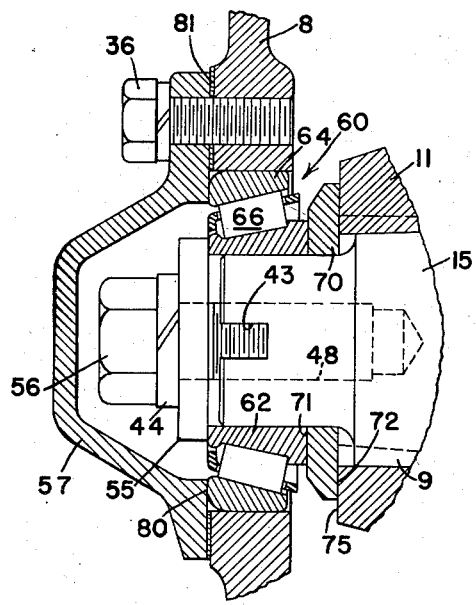
Figure 3 is a fragmentary sectional view showing a portion of the final drive housing of Figure 2, in which the implement drive has been replaced by a securing bolt and washer.

When the implement drive above described is not being used (Figure 3), it may be replaced by a large washer 55 and a short cap screw 56, the purpose of the washer being to hold the bearing 60 in place on the axle 15. The lubricant seal retainer 33 is replaced by a cap 57 which is held in place by the same bolts 36.

When the operator desires to install the implement drive 20, it is only necessary for him to remove the bolts 36, thus removing the sealing cap 57, and to remove the cap screw 56 and washer 55. He then adds the extension 21, cap screw 45 and washer 44 with the lugs 40 and 41 interfitting with the groove 43 and then installs the lubricant seal 32 and retainer 33 by means of the bolts 36.

I claim:

1. In a tractor including a housing having a wall provided with an opening and carrying an axle having an outer end portion in axial register with the opening and provided with a radial end face having a radial slot therein, said end portion being provided further with an axial bore opening at said radial face, said axle end portion having a cylindrical outer surface, and a bearing in the wall in axial register with the opening and having an inner circular surface directly contacting the cylindrical outer surface of the axle end portion for journaling said axle end portion, said inner circular surface projecting axially outwardly beyond the end face of the axle, the improvement residing in a power take-off attachment adapted for connection to the axle and housing, comprising: a shaft positioned as an axial extension of the axle to project outwardly beyond the housing wall, said shaft having a cylindrical inner end pilot portion received within that portion of the bearing inner surface that projects axially outwardly beyond the radial end face of the axle, said inner end pilot portion having a radial end face abutting the radial end face of the axle and further including a driving lug projecting axially into the slot in said radial end face of the axle; thrust means including a shoulder on the shaft just axially outwardly of the aforesaid cylindrical inner end pilot portion for directly engaging the bearing; said shaft further having an axial bore therethrough; securing means passed through the bore of the shaft and into the axle bore and engaging the shaft and axle for securing said shaft and axle together against relative axial displacement; said shaft lying wholly axially outwardly of the bearing except for the driving lug and the pilot portion and being free from radial contact with the bearing except for the radial contact of said pilot portion with said bearing; collar means encircling the shaft and having means for the fixed mounting thereof on the housing wall in register with the opening; and means on the collar for engaging and retaining the bearing against axial displacement outwardly relative to the housing wall.

2. A shaft coupling, comprising: a first shaft having one end portion provided with a flat radial face having a recess let into said face and disposed radially relative to the shaft axis, said shaft further having an outer cylindrical surface and an axial bore extending inwardly from said face; a bearing surrounding said end portion and having an inner circular surface directly engaging the outer cylindrical surface of said first shaft, said bearing further having an outer radial surface slightly offset axially outwardly of said face; a second shaft coaxial with the first shaft and having an inner end portion provided with an inner radial face disposed in end-to-end relation with the radial face of the first shaft end portion, said second shaft end portion terminating at its radial face except for the provision of an axially projecting, radially disposed drive lug received in the first shaft recess, said second shaft having an annular shoulder engaged with the outer radial surface of the bearing, and said second shaft further having an axial bore therethrough from its outer to its inner end; and securing means passed through said second shaft bore and into the first shaft bore and engaging both shafts for securing the shafts together.

References Cited in the file of this patent

UNITED STATES PATENTS

| Number | Name | Date |
| --- | --- | --- |
| 826,944 | Krieger | July 24, 1906 |
| 1,629,949 | Caffarello | May 24, 1927 |
| 1,820,017 | Foulks | Aug. 25, 1931 |
| 2,126,612 | Buckwalter et al. | Aug. 9, 1938 |